United States Patent
Albrecht et al.

(10) Patent No.: US 7,106,582 B2
(45) Date of Patent: Sep. 12, 2006

(54) SHOCK MOUNT ASSEMBLY FOR ATTACHMENT OF AN ELECTRONIC DEVICE TO A SUPPORT STRUCTURE

(75) Inventors: David W. Albrecht, San Jose, CA (US); Qinghua Zeng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 202 days.

(21) Appl. No.: 10/882,940

(22) Filed: Jun. 30, 2004

(65) Prior Publication Data

US 2006/0002076 A1    Jan. 5, 2006

(51) Int. Cl.
*H05K 5/00* (2006.01)
*H05K 7/00* (2006.01)

(52) U.S. Cl. ...................................... 361/685
(58) Field of Classification Search ................ 361/685; 248/638
See application file for complete search history.

(56) References Cited

U.S. PATENT DOCUMENTS

| | | | | |
|---|---|---|---|---|
| 5,422,767 | A | * | 6/1995 | Hatchett et al. ......... 360/98.01 |
| 5,673,171 | A | * | 9/1997 | Varghese et al. ............ 361/685 |
| 5,677,811 | A | * | 10/1997 | Kuno et al. ............... 360/97.01 |
| 6,005,768 | A | * | 12/1999 | Jo ............................... 361/685 |
| 6,075,695 | A | * | 6/2000 | Konno et al. ................ 361/685 |
| 6,078,498 | A | * | 6/2000 | Eckerd et al. ............... 361/685 |
| 6,275,353 | B1 | * | 8/2001 | Briggs ...................... 360/97.02 |
| 6,297,928 | B1 | * | 10/2001 | Hahn et al. .............. 360/97.01 |
| 6,377,450 | B1 | * | 4/2002 | Gan ............................ 361/685 |
| 6,545,865 | B1 | | 4/2003 | Albrecht et al. |
| 6,567,265 | B1 | | 5/2003 | Yamamura et al. |
| 6,671,124 | B1 | | 12/2003 | Guion et al. |
| 6,717,816 | B1 | * | 4/2004 | Tanaka et al. .............. 361/728 |
| 6,760,219 | B1 | * | 7/2004 | Hood et al. ................. 361/685 |
| 6,826,056 | B1 | * | 11/2004 | Tsuyuki et al. ............. 361/725 |
| 6,956,738 | B1 | * | 10/2005 | Bruner et al. ............... 361/685 |
| 2002/0044416 | A1 | | 4/2002 | Harmon, III et al. |
| 2002/0104950 | A1 | * | 8/2002 | Mayama ..................... 248/638 |
| 2003/0011980 | A1 | * | 1/2003 | Albrecht et al. ............ 361/685 |

(Continued)

FOREIGN PATENT DOCUMENTS

EP          05253106          8/2005

(Continued)

*Primary Examiner*—Lynn Feild
*Assistant Examiner*—Ingrid Wright
(74) *Attorney, Agent, or Firm*—Thomas R. Berthold

(57) ABSTRACT

A mechanical-shock-mount assembly enables attachment of a mechanical-shock-sensitive electronic device to a support structure. Two identical shock-mount structures are attached and located on opposite sides of an electronic device. Each shock-mount structure has a pair of generally planar spring-like cantilever beams that have their free ends for attachment to the support structure. Damping material is located on the surfaces of the cantilever beams between the beams and clamping surfaces. At least one clamping surface is a plate that compresses the damping material between itself and the beam and/or compresses the damping material between the beam and a surface of the support structure when it is attached to the support structure. This shock-mount structure acts as a highly-damped nonlinear spring system that provides mechanical-shock resistance for the device in a direction perpendicular to the cantilevered beams and high stiffness in a direction in the plane of the beams. If desired, the shock-mounts can be first assembled to the support structure before attaching the device. The support structure can optionally have additional features for attaching other components of the device host.

6 Claims, 6 Drawing Sheets

U.S. PATENT DOCUMENTS

2003/0174464 A1* 9/2003 Funawatari et al. ........ 361/685
2003/0210519 A1  11/2003 Wubs

FOREIGN PATENT DOCUMENTS

GB        02392969 A    3/2004

* cited by examiner

SHOCK MOUNT ASSEMBLY FOR ATTACHMENT OF AN ELECTRONIC DEVICE TO A SUPPORT STRUCTURE

BACKGROUND OF THE INVENTION

1. Field of the Invention

This invention relates generally to mechanical-shock-mounts or shock absorbers for attachment of mechanical-shock-sensitive electronic devices to support structures.

2. Description of the Related Art

Many types of electronic devices, such as disk drives, including optical disk drives and magnetic recording hard disk drives (HDDs), are sensitive to mechanical shock, i.e., sudden acceleration or deceleration. Disk drives are especially sensitive to shock in a direction perpendicular or normal to the disks. Mechanical-shock-sensitive electronic devices are finding wide use in portable host systems, such as notebook computers, personal digital assistants (PDAs), cell phones, and MP3 music players, all of which experience mechanical shock in ordinary use.

What is needed is a shock-mount assembly for attachment of a mechanical-shock-sensitive electronic device to a support structure, wherein the support structure can be part of the host system or an independent structure that can in turn be attached to the host system.

SUMMARY OF THE INVENTION

The invention is a shock-mount assembly for attachment of an electronic device to a support structure. Two identical assemblies are located on opposite sides of the electronic device and attach it to the support structure. Each shock-mount assembly has a suspension member with a spring-like cantilever beam attached to each end. The cantilever beams are generally planar and have their free ends attached to mounting platforms on the support structure. Damping material is located on the planar surfaces of the cantilever beams between the beams and the mounting platforms. The assembly includes a clamping plate that compresses the damping material between the beams and the mounting platforms when the clamping plate and beams are attached to the support structure. The shock-mount assemblies with the spring-like cantilever beams and the compressed damping material thus act as a highly-damped nonlinear spring system that provides mechanical-shock resistance for the device in a direction perpendicular to the planar beams and high stiffness in a direction parallel to the planar beams.

The shock-mount assembly may be part of an HDD assembly that includes two shock-mount assemblies attached to the sides of the HDD, with the free ends of the cantilever beams attached generally at the middle of the sides of a frame that generally surrounds the HDD and acts as the support structure. The clamping plate of each shock-mount assembly has a hole or notch at its end for attachment to the frame to provide additional rigidity of the clamping plate and frame. The frame can have attachment and alignment features for a printed-circuit card, which permits the HDD to be readily shock-mounted inside a portable host system, such as an MP3 player, that is typically subjected to mechanical shock during ordinary use.

For a fuller understanding of the nature and advantages of the invention, reference should be made to the following detailed description taken together with the accompanying figures.

DETAILED DESCRIPTION OF THE INVENTION

Figure 1:
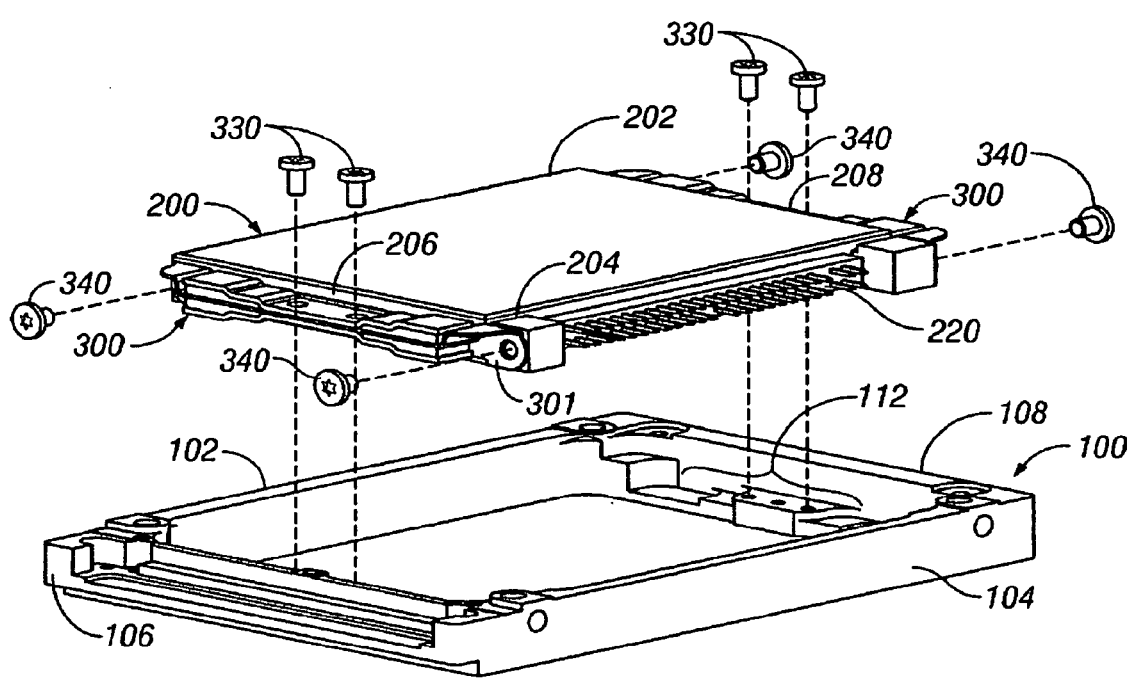
FIG. 1 is an exploded isometric view showing the relationship between the shock-mount assemblies of this invention, a support structure, and the electronic device.

FIG. 1 is an exploded isometric view showing the relationship between the shock-mount assemblies 300 of this invention and a support structure, represented as a frame 100, and the electronic device, represented as a hard-disk drive (HDD) 200. The support structure (frame 100) has sides 102, 104, a front end 106 and a rear end 108. The frame includes mounting platforms for attachment of the shock-mount assemblies 300, such as platform 112 shown on frame rear end 108. Fasteners, such as screws 330, attach the mount assemblies to the mounting platforms. The electronic device (HDD 200) has sides 202, 204, and ends 206, 208. Each shock-mount assembly 300 is attached to a respective end 206, 208 of the HDD 200 by fasteners, such as screws 340.

Figure 2:
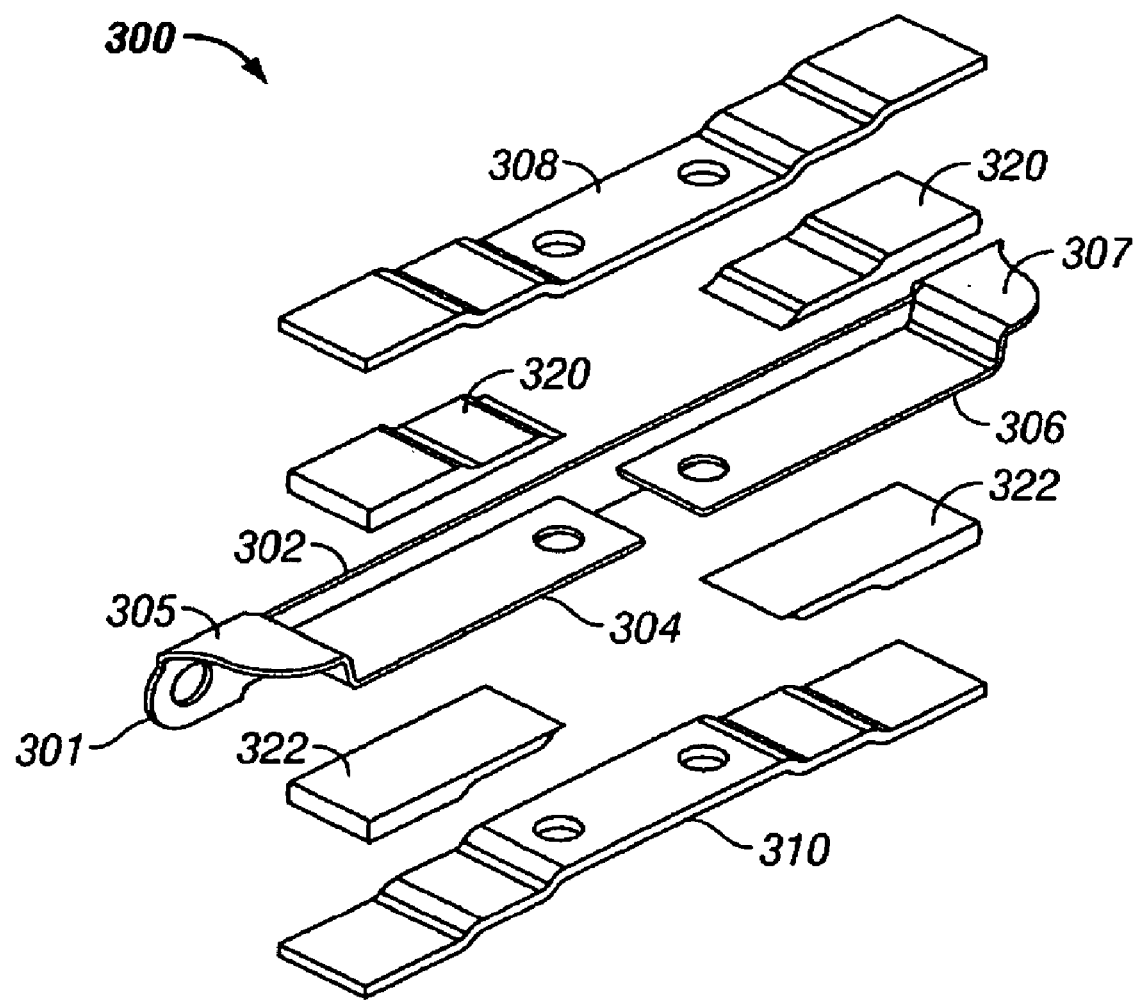
FIG. 2 is an exploded isometric view of the shock-mount assembly of this invention.
Figure 3A:
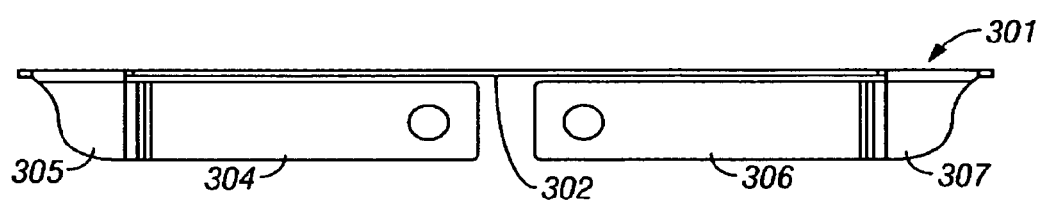
FIGS. 3A and 3B are top and side views, respectively, of the suspension member of the shock-mount assembly of this invention.
Figure 3B:
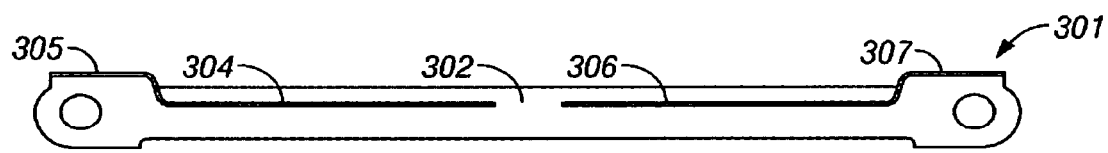

FIG. 2 is an exploded isometric view of shock-mount assembly 300 and shows a suspension member 301, damping layers 320, 322, and clamping plates 308, 310 that compress the damping layers when the shock-mount assembly is attached to the support structure. The suspension member 301 includes a generally planar cross member 302 and two generally planar cantilever beams 304, 306 oriented generally perpendicular to planar cross member 302. The fixed end of cantilever beam 304 is attached to cross member 302 at one end 305 of the cross member and the fixed end of cantilever beam 306 is attached to cross member 302 at the other end 307 of the cross member. As shown by the top view (FIG. 3A) and side view (FIG. 3B) of suspension member 301, each cantilever beam has a generally "Z-shaped" bend (e.g., as shown by end 305 and beam 304) which increases its stiffness. The beam profile, i.e., the shape of the "Z", can be tailored to alter the stiffness. The free end of each cantilever beam 304, 306 has a hole for passage of a mounting screw. The use of the shock-mount assembly with cantilever beams that have their free ends attached to the support structure allows some flexibility and slight movement of the electronic device within the support structure. When the device is an HDD, this improves the mechanical-shock resistance of the HDD in a direction perpendicular to the planes of the disks (perpendicular to the planar cantilever beams) while providing high lateral stiffness parallel to the planes of the disks (parallel to the planar cantilever beams). This is especially important when the HDD is used in portable host systems, typically notebook computers. The cross member 302 that connects the fixed ends of the two cantilever beams 304, 306, is a rigid member that reduces shear stress at the screw attach points to the HDD 200 when the HDD 200 deflects under a mechanical shock, and thus prevents loss of torque on the screws 340 (FIG. 1).

The shock-mount assembly 300 functions as a highly-damped, essentially nonlinear spring system because of the damping material located between the cantilever beams and the support structure. Referring again to FIG. 2, this is shown by damping material 322 that is placed between the cantilever beams 304, 306 and the mounting platforms, such as platform 112 (FIG. 1) of frame 100. A bottom clamping plate 310 can optionally be located between the damping material 322 and the mounting platforms. Alternatively, the mounting platforms in the frame 100 can be shaped to provide the function of bottom clamping plate 310. The clamping plates 308, 310 have holes in their mid-regions for alignment with the holes in the ends of the cantilever beams 304, 306 when the shock-mount assembly is attached to the support structure. Additional damping material 320 can also optionally be located on top of the cantilever beams 304, 306 and secured by a top clamping plate 308. The clamping plates 308, 310 have a material composition and/or thickness so as to be stiffer than the more flexible spring-like cantilever beams 304, 306. This results in a shock-mount assembly that is a highly-damped, essentially nonlinear spring system supporting the electronic device on the support structure. Suitable materials for the cross member 302 and cantilever beams 304, 306 are steel or spring steel. A suitable material for the clamping plates 308, 310 is aluminum or steel. The damping material may be a layer of an adhesive viscoelastic material such as commercially-available damped elastomers or polymers, which absorb energy by shear strain and/or compression, or a "soft" foam-like material, such as urethane, which absorbs energy primarily by compression.

Figure 4:
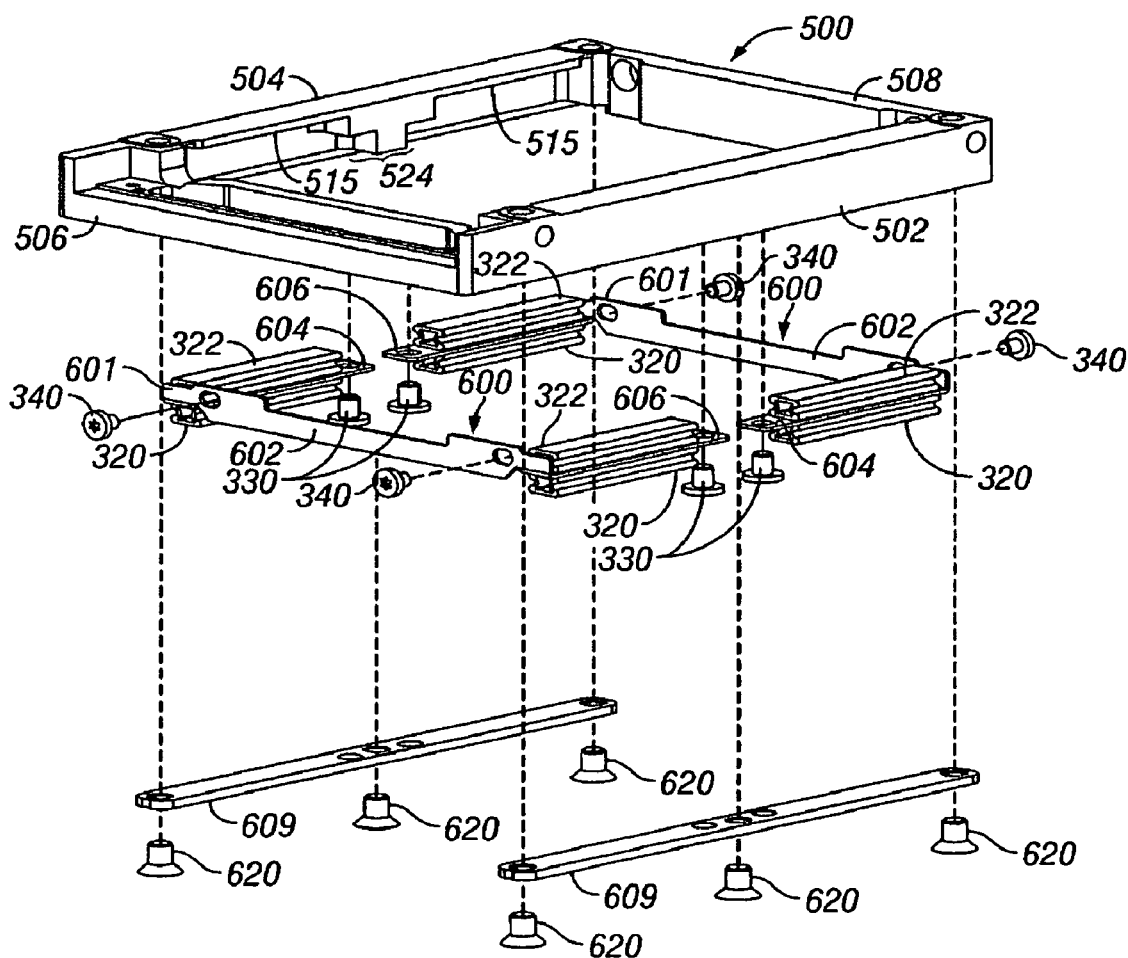
FIG. 4 is an exploded isometric view showing the relationship between a support structure or frame and a pair of shock mounts of this invention of a second embodiment showing how the pair of shock mounts can be first assembled to the frame before receiving an electronic device.
Figure 5:
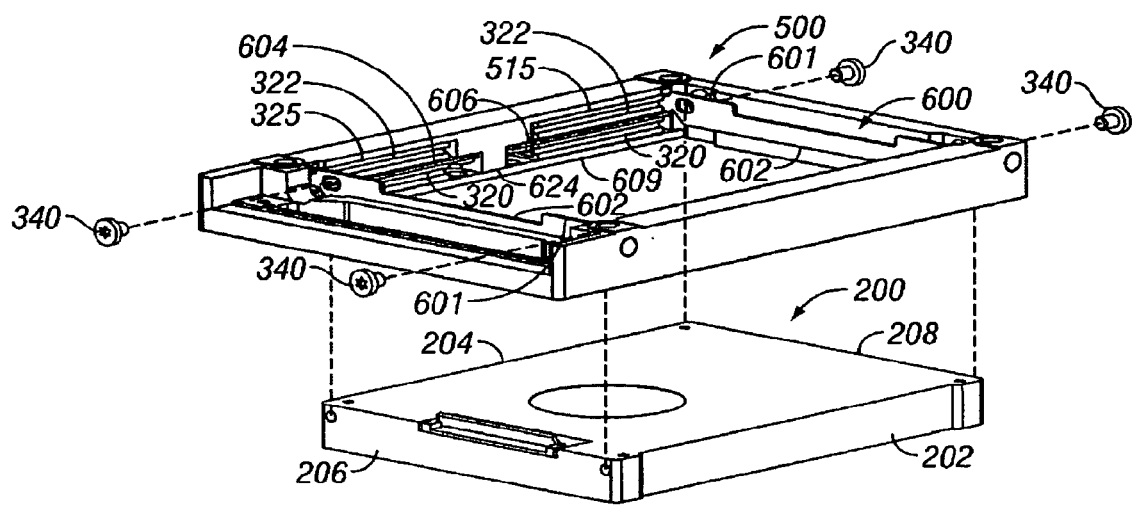
FIG. 5 is an exploded isometric view of the first assemblies of FIG. 4 having a pair of shock mounts of an embodiment of this invention, a 1.8 in. form-factor HDD as the electronic device, and the fasteners for attaching the HDD to the shock mounts.

FIG. 4 is an exploded isometric view showing the relationship between a second embodiment of the shock-mount assemblies of this invention and a support structure, represented as a frame 500. Each shock-mount 600 has a suspension member 601 with cantilever beams 604, 606 at the ends of a cross member 602, and damping layers 320, 322 associated with each beam. Unlike the embodiment in FIGS. 1–3, the suspension member 601 has the cantilever beams 604, 606 oriented with their lengths generally perpendicular to the length of cross member 602. The embodiment shown in FIGS. 4 and 5 is useful when the electronic device does not have mounting holes on its sides because it enables the free ends of the cantilever beams to still be located along the sides of the device, as shown in FIG. 5 by cantilever beams 604, 606 extending along the sides 202, 204 of HDD 200. In this second embodiment two shock-mounts 600 and two clamping plates 609 form a pair of shock-mount assemblies. The support structure (frame 500) has sides 502, 504, a front end 506 and a rear end 508. In FIG. 4 the frame 500 includes mounting platforms for attachment of the shock-mounts 600, such as platform 524 shown on frame side 504, and surfaces, such as surfaces 515, that act as the bottom clamping plates. Fasteners, such as screws 330, attach the shock-mounts 600 to the mounting platforms. Clamping plates 609 are secured to the frame 500 by screws 620 and compress the damping layers 320, 322 between the beams and clamping plates and between the beams and clamping surfaces 515 of the frame 500. Each clamping plate 609 clamps respective ends of the two shock-mounts 600. Each clamping plate also has additional features at its ends for attachment to the frame to provide additional rigidity of the clamping plate.

FIG. 5 shows the pair of shock-mount assemblies and frame of FIG. 4 with an electronic device (1.8 in. form-factor HDD 200). HDD 200 has sides 202, 204, and ends 206, 208. Each suspension member 601 of each shock-mount is attached to a respective end 206, 208 of the HDD 200 by fasteners, such as screws 340.

Figure 6:
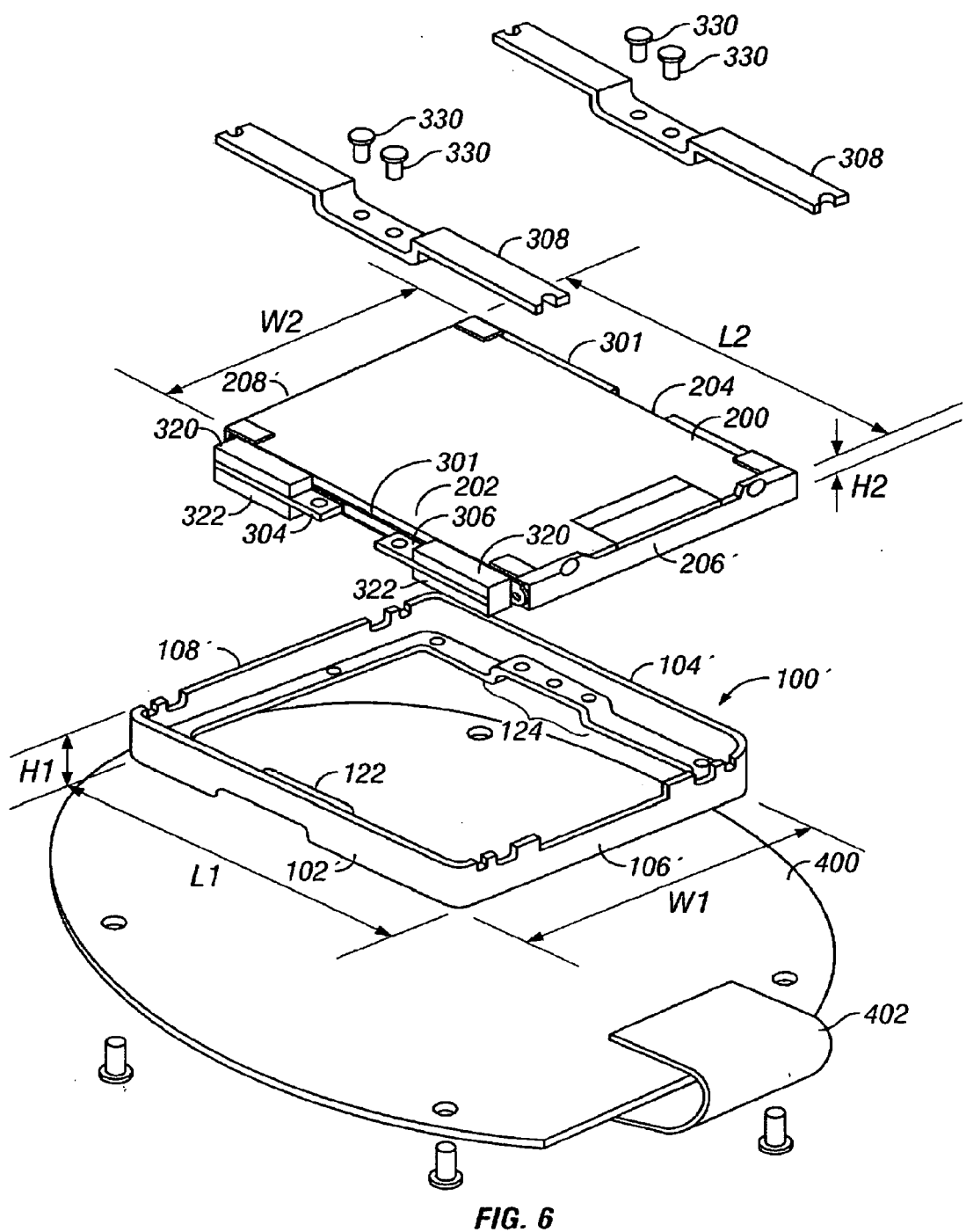
FIG. 6 is an exploded isometric view of a support structure in the form of a sheet metal frame and the shock-mount assemblies of this invention, an electronic device in the form of an HDD, and with the frame having a datum and attachment features to receive a printed circuit card.

FIG. 6 is an exploded isometric view of the configuration of FIG. 4 having a formed sheet metal frame 100', an HDD 200' and the shock-mount assemblies with top clamping plates 308' having additional features. The frame 101' has sides 102', 104' of length L1 with mounting platforms 122, 124; ends 106', 108' of width W1; and a height H1. The HDD 200' has sides 202', 204' of length L2 less than L1; ends 206', 208' of width W2 less than W1; and a height H2. The suspension member 301 of each shock-mount assembly is shown attached to a respective side of HDD 200' and the free ends of the cantilever beams of each shock-mount assembly are attached to a mounting platform on a respective side of frame 100'. Similarly the shock-mount 600 of FIG. 4 can be attached to ends 206, 208 of HDD 200 with the damped cantilevered beam structures on sides 202, 204 of HDD 200. The frame 100' has mounting platform 124, and is shaped to have surfaces 115 that function as bottom clamping plates. Each of the top clamping plates 308' has a length at least as long as suspension member 301 and preferably a length L1. The thicknesses of the damping layers is selected so that when the top clamping plates 308' are secured by screws 330, the clamping plates 308' are substantially flush with the height H1 of frame 100'. Each top clamping plate 308' has its ends adapted for attachment to the frame 100', e.g., by a hole or notch at its ends. Because each clamping plate 308' is also attached to the frame 100' at its ends, in addition to its mid-region, the shock-mount assemblies of FIG. 6 provide additional rigidity of the clamping plates and frame.

As shown in FIG. 6, the frame 100' of sheet metal can have attachment features for a printed-circuit card 400 with electrical connection made to HDD 200' by flex cable 402. The attachment of the card 400 frame 100' can be facilitated by alignment of datum points (not shown) on the frame and card during assembly. Similarly, the assembly depicted in FIG. 4 comprising the frame 500 and the pair of shock-mount assemblies (the two shock-mounts 600 and two clamping plates 609) can also have features for alignment and attachment of card 400. The arrangement shown in FIG. 6 permits an HDD to be shock-mounted inside a portable host system, such as an MP3 player, that is typically subjected to mechanical shock during ordinary use.

In the above-described figures, the support structure has been depicted as a frame that generally surrounds the electronic device, and the device has been depicted as an HDD. However, the support structure may be any generally rigid structure, such as a wall or floor of a housing that supports one or more components of the host system, including the electronic device that requires shock-mounting. Preferably the wall or floor has a mounting platform configured to receive the shock-mount assembly. Similarly, the electronic device may be any device that benefits from shock-mounting, including devices with moving parts, and particularly rotating disk devices which have generally low tolerance to mechanical shocks perpendicular to the disk plane and require relatively high stiffness parallel to the disk plane.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A shock-mount assembly for attachment of an electronic device to a support structure comprising:
   a suspension member comprising (a) a generally planar cross member having two ends, each end having a hole for attachment to the electronic device, (b) a first generally planar cantilever beam having its fixed end attached to one end of the cross member, the first cantilever beam extending generally parallel to the length of the cross member with its free end located closer to the midpoint of the cross member than to the end of the cross member, the first cantilever beam having its plane oriented generally perpendicular to the plane of the cross member, and (c) a second generally planar cantilever beam having its fixed end attached to the other end of the cross member, the second cantilever beam extending generally parallel to the length of the cross member with its free end located closer to the midpoint of the cross member than to the end of the cross member, the second cantilever beam having its plane oriented generally perpendicular to the plane of the cross member, the first and second beams being generally coplanar and having holes in their free ends for attachment to the support structure;
   damping material located on each generally planar surface of each cantilever beam;
   at least one clamping plate having holes for alignment with the holes on the free ends of the cantilever beams for compressing the damping material against the beams when the free ends of the beams are attached to the support structure; and
   fasteners for attaching the clamping plate and the cantilever beams to the support structure through the aligned holes of the clamping plate and the cantilever beams, the clamping plate compressing the damping material when attached to the support structure by the fasteners.

2. The assembly of claim 1 wherein the ends of the clamping plate are adapted for attachment to the support structure.

3. The assembly of claim 1 wherein the damping material comprises a damping layer located on each side of each cantilever beam.

4. The assembly of claim 1 wherein the damping material comprises damping layers adhered to the beams and the surfaces of the clamping plates.

5. The assembly of claim 1 further comprising a support structure, and wherein the support structure includes a clamping surface, said clamping surface functioning as a clamping plate.

6. A hard-disk-drive (HDD) assembly comprising:
   a support structure comprising a frame having two sides with length L1 and two ends with width W1;
   an electronic device comprising an HDD having two sides with length L2 less than L1 and two ends with width W2 less than W1;
   a pair of shock-mounts, each shock-mount being attached to a respective end of the HDD and comprising:
      (a) a cross member extending along and attached to an end of the HDD and having two ends, a first generally planar cantilever beam extending generally along one side of the HDD and having its fixed end attached to one end of the cross member and its free end located closer to the midpoint of said one HDD side than to said one end of the crossmember, a second generally planar cantilever beam extending generally along the other side of the HDD and having its fixed end attached to the other end of the cross member and its free end located closer to the midpoint of said other HDD side than to said other end of the crossmember, the first and second beams being generally coplanar and having holes in their free ends for attachment to the sides of the frame; and (b) damping material located on each generally planar surface of each cantilever beam;
   fasteners insertable through the holes in the free ends of the cantilever beams for attaching the free ends of the cantilever beams to the sides of the frame, the HDD being attached to the frame solely by the fasteners; and
   a pair of clamping plates for compressing the damping material against the beams when the free ends of the beams are attached to the frame, each clamping plate being attached to a respective side of the frame.

* * * * *